United States Patent [19]

Livet

[11] Patent Number: 4,531,708
[45] Date of Patent: Jul. 30, 1985

[54] SOLENOID VALVE

[75] Inventor: Jean Livet, Geneva, Switzerland

[73] Assignee: Honeywell Lucifer SA, Geneva, Switzerland

[21] Appl. No.: 642,854

[22] Filed: Aug. 21, 1984

[51] Int. Cl.³ .............................................. F16K 31/12
[52] U.S. Cl. ..................................... 251/48; 251/141; 251/139; 251/359
[58] Field of Search .................. 251/48, 357, 359, 139, 251/141; 335/257, 249, 271, 277; 137/625.65

[56] References Cited

U.S. PATENT DOCUMENTS

| | | | |
|---|---|---|---|
| 557,292 | 3/1896 | Turner | 251/48 |
| 929,007 | 7/1907 | Phillips | 251/48 |
| 2,407,957 | 9/1946 | Hull-Ryde | 251/48 X |
| 2,654,560 | 10/1953 | Smith | 251/362 X |
| 2,666,614 | 1/1954 | Grove et al. | 251/362 X |
| 2,688,337 | 9/1954 | Shivers | 251/48 X |
| 3,013,768 | 12/1961 | La Mastra | 251/139 X |
| 3,463,257 | 8/1969 | Inomata et al. | 251/48 X |
| 4,403,765 | 9/1983 | Fisher | 251/139 X |

Primary Examiner—Larry Jones
Attorney, Agent, or Firm—Mitchell J. Halista; Trevor B. Joike

[57] ABSTRACT

A solenoid valve includes a body (2,25) with an internal intake pipe (26) and an internal outlet pipe (27), a coil (4) and a movable stem (3), urged by a spring (10) toward a valve closed position. The stem (3) defines, with a seat (30), an annular sealing surface (22), surrounded by a groove (17) and by an annular flange (18). The flange defines with an annular counterpart (25) placed opposite, an annular damping surface (23). The groove (17) communicates with the outlet pipe (27) through a longitudinal slot (12) provided in the stem (3). The annular flange (18) is in a position near or in contact with the counterpart (25) when the valve is closed. During a closing of the valve, the liquid between the annular flange (18) and the counterpart (25) escapes radially through the groove (17) from the annular damping surface. This produces a braking effect on the stem (3), to reduce wear on the annular sealing surface (22).

15 Claims, 6 Drawing Figures

SOLENOID VALVE

BACKGROUND OF THE INVENTION

FIELD OF THE INVENTION

The invention pertains to solenoid valves. More specifically, the present invention is directed to a solenoid valve having a movable ferromagnetic stem selectively displaceable by a magnetic field produced by an electrical coil energized by an exciting current with the ferromagnetic stem including a closing device cooperating with a seat to control a fluid flowing through the valve.

SUMMARY OF THE INVENTION

An object of the present invention is to provide an improved solenoid valve.

In accomplishing this and other objects, there has been provided, in accordance with the present invention, a solenoid valve including a movable ferromagnetic stem selectively displaceable by a magnetic field produced by an exciting current with the ferromagnetic stem having a closing device cooperating with a seat to control fluid through the valve by defining with the seat an annular sealing surface in a valve closed position characterized by a damping device comprising at least a second annular surface, separated from the annular sealing surface by a space and cooperating with a counterpart third annular surface to define an annular damping surface when the closing device is in contact with the seat and at least one fluid passage communicating with the space between the second and third annular surfaces.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Solenoid valves are known that also can be supplied with variable frequency current. For such valves operating at high frequencies, the mass and stroke of the movable stem must be relatively low. Likewise, in order that the force exerted on the closing device required for sealing the valve may be light, the area of annular sealing surface must be as small as possible. Decreasing that surface, however, entails a disadvantage in that the closing device and the seat are quickly worn out by mechanical battering resulting in a greatly shortened valve life.

The purpose of this invention is to remedy that disadvantage and it is characterized by the valve including a damping device consisting of at least a second annular surface, separated from the annular sealing surface by a space. The second annular surface cooperates with a counterpart or third annular surface placed opposite, to constitute an annular damping surface. The second annular surface is positioned near or in contact with the counterpart when the closing device is in contact with the seat. The space between the annular surfaces forming the annular damping surface communicates with a valve outlet pipe through at least one fluid passage. In effect, when the valve closes, fluid between the second annular surface and the third annular surface escapes radially so as to constitute only a thin film at the end of the stroke. This produces a gradual braking effect on the stem before the closing device comes into contact with the seat.

Figure 1:
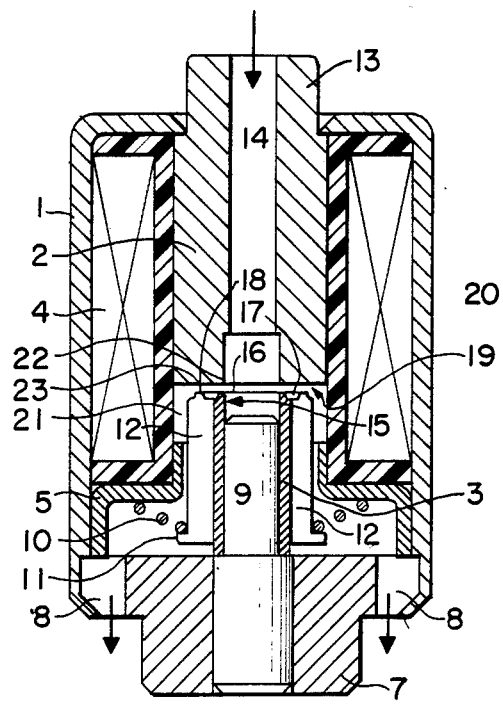
FIG. 1 is an axial cross-section of a solenoid valve embodying an example of the present invention.

As shown in FIG. 1, the valve includes a cylindrical casing 1 of ferromagnetic material. The casing 1 and an inner cylindrical part 2 are attached together to constitute a fixed stem or stop against which a movable hollow ferromagnetic stem 3 is arranged to stroke. An electrical coil 4 is placed between the casing 1 and the fixed stem 2, and is held to the latter by a fastening part 5. The lower end of the casing 1 constitutes a skirt 6, its free end secured to a body 7, presenting a passage 8 for the fluid to be controlled by the valve. The body 7 includes a central guide 9 on which the movable hollow stem 3 is slideably mounted.

The stem 3 is attracted in the direction of the body 7 by a return spring 10, having one end resting against the fastening part 5 and the other end against a collar 11 on the stem 3. The stem 3 has at least one longitudinal slot 12 constituting a passage for the fluid. The stem 3 itself constitutes the closing device and is intended to impact against the fixed stem 2 to close the fluid passage. The fluid to be controlled by the valve is carried by a pipe, not shown, the end of which is attached to a tip 13 of the fixed stem 2 so that the fluid can penetrate into the valve through a bore 14 extending through the fixed stem 2. The movable stem 3 has a bore 15 with an upper rim finished off with an annular flange 16 to form a valve closing device intended to rest against the lower side of the stem 2 which acts as a seat 20 to define an annular sealing surface 22 in valve closed position.

The valve includes a damping device 19, constituting a second annular surface in the form of a flange 18, separated from the flange 16 by an annular throat 17. That flange 18 cooperates with the fixed stem 2 as a counterpart third annular surface to constitute an annular damping surface 23. When the annular flange 16 comes to rest against the fixed stem 2, the flange 18 is in the immediate proximity of the annular surface 23, or even in contact with it. The annular throat 17 communicates, through the slots 12, with the passage 8, serving as an outlet channel for the liquid between the second and third annular surfaces.

Thus, when the valve closes, the liquid between the second flange 18 and the surface of the stem 2 must escape radially toward the annular throat 17 and toward the chamber 21, between the coil 4 and the stem 3. This produces a braking effect on the stem 3 before the flange 16 comes into contact with the seat 20. Preferably, the annular surface 23 is larger than the annular sealing surface 22. In principle, the valve is constructed so that, in a valve closed position, there is a clearance of a few hundred millimeters between the flange 18 and the surface 23 while the flange 16 is in contact with the stem 2. Repeated valve closings produce a battering of the flange 16 and its support surface so that the clearance between the flange 18 and the annular surface 23 substantially disappears.

It can be seen that for all valve open positions, the entire outer surface of the stem 3 is surrounded by a fluid at constant pressure. Therefore the stem 3 is not subject to hydraulic forces likely to change its position as defined by the exciting current in the coil 4 and by the return force of the spring 10. To allow compensation of the hydraulic forces acting on the closing device particularly if the bore 15 in the stem 3 extends to the upper end of that stem with no change in diameter, the diameter of the guide 9 must be at least equal to the inner diameter of the seat.

Figure 2:
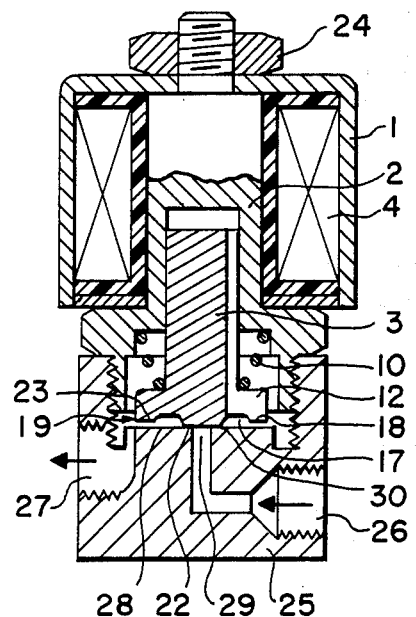
FIG. 2 is an axial cross-section of a solenoid valve embodying a second example of the present invention.

In FIG. 1, the valve is in an open position in the absence of coil exciting current while FIG. 2 shows a valve closed in the absence of coil exciting current. In FIG. 2, the elements corresponding to those shown in FIG. 1 have the same reference numbers. Thus, a cylindrical casing 1 containing the coil 4 is fastened by a nut 24 to the inner cylindrical part 2. A base body 25 is screwed onto part 2, and has an internal intake pipe 26 and an internal outlet pipe 27, The movable stem 3 has at least one longitudinal slot 12 and is urged by the spring 10 toward its closed position. A base body 25 has a flat surface 28 coaxial with the movable stem 3, with a central protruding porition 29 cooperating with the rim 30 of the end of the intake pipe 26 to form an annular sealing surface 22. That surface 22 is surrounded by a groove 17 and by an annular flange 18, constituting, with the portion of the facing flat surface 28, an annular damping surface 23. The groove 17 also communicates with the outlet pipe 27 through the longtudinal slot 12.

Figure 3:
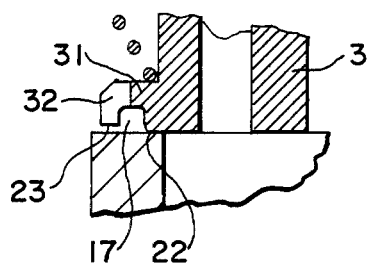
FIGS. 3 to 6 are magnified axial cross-sections of alternative examples of the present invention.

The alternate examples of the present invention illustrated in FIGS. 3 to 6 are different due to the arrangement of the annular surfaces, the groove and their communication with the outlet pipe. In FIG. 3, the movable stem 3 has a protruding lateral portion 31 with the annular damping surface 23 separated from the annular sealing surface 22 by a groove 17. Radial slots 32, only one of which is shown, are provided in the protruding portion 31 and serve as a passage for the liquid trapped in the groove 17.

Figure 4:
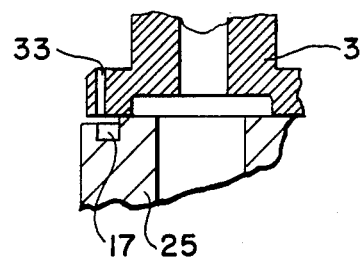
Figure 5:
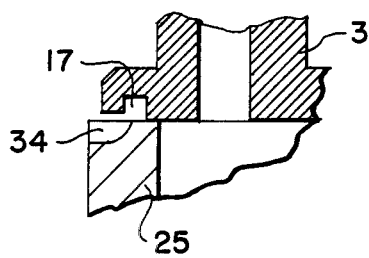
Figure 6:
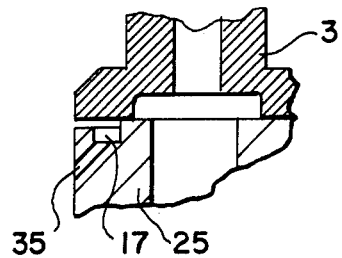

In the example shown in FIG. 4, the groove 17 is located in the base body 25 while the passage connecting that groove 17 with the outlet pipe consists of at least one fluid conduit 33 passing through a portion of the movable stem 3 opposite the groove 17. On the other hand, in FIG. 5, the groove 17 is located in the peripheral part of the stem 3 and the passage is in the form of a radial slot 34 in the base body 25. Finally, in the example illustrated in FIG. 6, the groove 17 and the conduit 35 connecting that groove with the outlet pipe are located in the base body 25.

Accordingly, it may be seen that there has been provided, in accordance with the present invention, an improved solenoid valve.

The embodiments of the invention in which an exclusive property or privilege is claimed are defined as follows:

1. A solenoid valve including a movable ferromagnetic stem selectively displaceable through a magnetic field produced by an exciting current with the ferromagnetic stem having a closing device cooperating with a seat to control fluid through the valve by defining with the seat an annular sealing surface in a closed valve position characterized by a damping device comprising at least a second annular surface encompassing the annular sealing surface and separated from the annular sealing surface by a space and cooperating with a counterpart third annular surface to define an annular damping surface when the closing device is in contact with the seat and at least one fluid passage communicating with the space between the second and third annular surfaces.

2. A valve according to claim 1, and further characterized by the damping surface being larger than the sealing surface.

3. A valve according to claim 2 and further characterized by the space between the annular surfaces consisting of a groove in the movable stem.

4. A valve according to claim 2 and further characterized by the space between the annular surfaces consisting of a groove in the seat.

5. A valve according to claim 1, and further characterized by the space between the annular surfaces consisting of a groove in the movable stem.

6. A valve according to claim 5, and further characterized by the passage to the groove being in the movable stem.

7. A valve according to claim 5 and further characterized by the passage to the groove being in the seat.

8. A valve according to claim 5, and further characterized by the movable stem having at least one longitudinal slot communicating with the groove.

9. A valve according to claim 1, and further characterized by the space between the annular surfaces consisting of a groove in the seat.

10. A valve according to claim 9 and further characterized by the passage to the groove being in the movable stem.

11. A valve according to claim 9, and further characterized by the passage to the groove being in the seat.

12. A valve according to claim 1 and further characterized by a spring means arranged to urge the movable stem toward the seat.

13. A valve according to claim 1 and further characterized by a space between the second and third annular surfaces when the closing device is in contact with the seat.

14. A valve according to claim 1 and further characterized by a coplanor relationship between the seat and the third annular surface.

15. A valve according to claim 1 and further characterized by the third annular surface being noncoplanar with the seat.

* * * * *